United States Patent [19]

Stowe

[11] Patent Number: 5,039,120
[45] Date of Patent: Aug. 13, 1991

[54] UNIVERSAL TOWING APPARATUS

[76] Inventor: Alan A. Stowe, 201 25th St., P.O. Box 703, Ocean City, N.J. 08226

[21] Appl. No.: 571,183

[22] Filed: Aug. 23, 1990

Related U.S. Application Data

[63] Continuation-in-part of Ser. No. 366,858, Jun. 15, 1989, abandoned.

[51] Int. Cl.⁵ .............................................. B60D 1/48
[52] U.S. Cl. .................................... 280/204; 280/292; 280/492
[58] Field of Search ............... 280/204, 292, 402, 408, 280/492

[56] References Cited

U.S. PATENT DOCUMENTS 4,114,919  9/1978  Stowe .................................. 280/292

Primary Examiner—Mitchell J. Hill

[57] ABSTRACT

Towing apparatus for towing a wheeled vehicle by another vehicle which includes a member attached to the towed vehicle which is detachably connected to an arm extending from a pivotedly mounted member which is engaged with a fixed member on the towing vehicle.

3 Claims, 2 Drawing Sheets

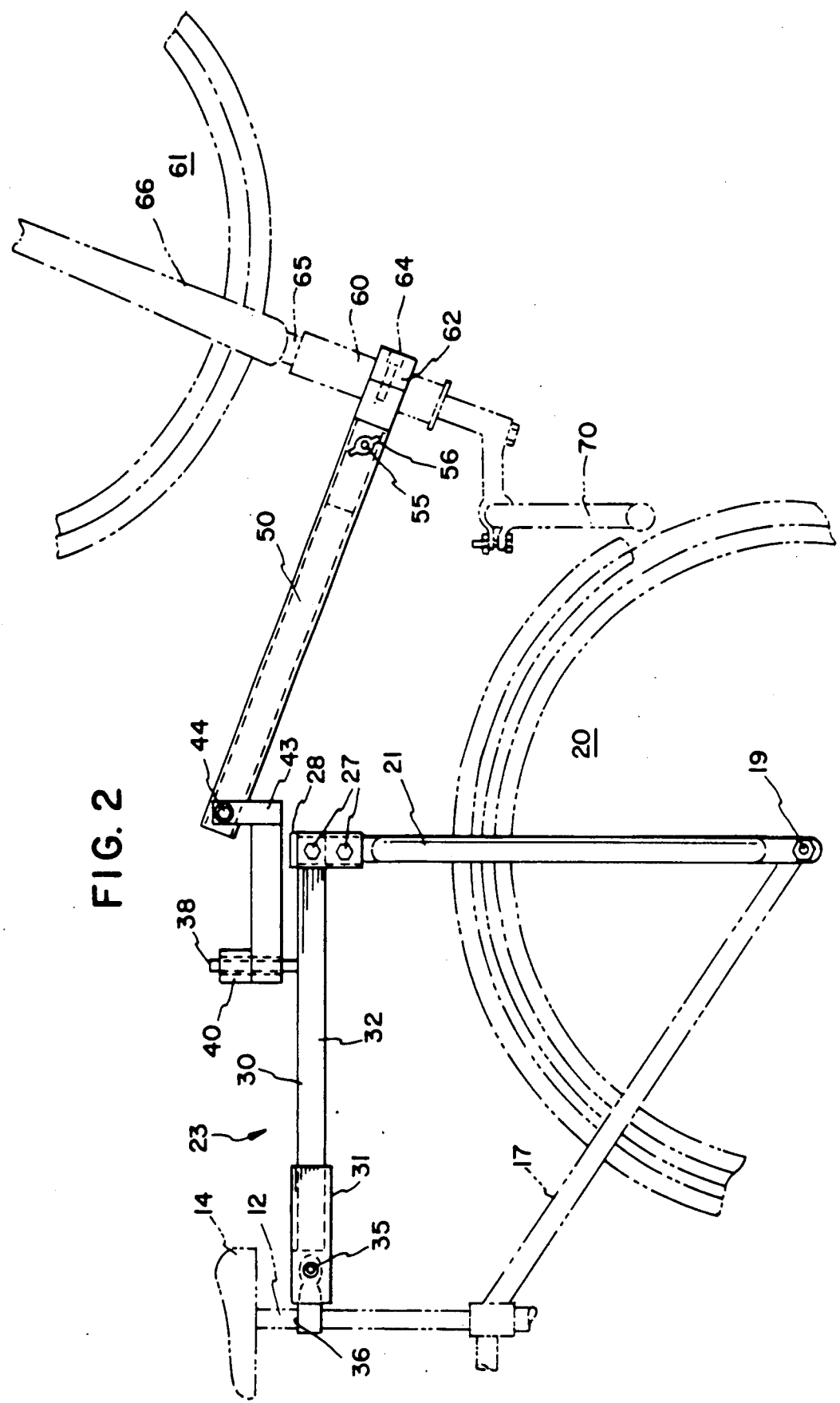

UNIVERSAL TOWING APPARATUS

This application is a continuation-in-part of application Ser. No. 7/366,858 filed Jun. 15, 1989 now abandoned.

BACKGROUND OF THE INVENTION

1. Field of the Invention

This invention relates to universal towing apparatus for towing wheeled vehicles such as bicycles and the like, which is of the type that includes members carried by each vehicle which can be easily attached and detached.

2. Description of the Prior Art

Towing apparatus for towing of a wheeled vehicle by another wheeled vehicle is in demand and is particularly desirable by bicyclists.

The use of bicycles for sport, and daily commuting has increased considerably in recent years.

One of the difficulties faced by bicycle owners occurs when a bicycle must be transported for repair or convenience of another. Bicycle carriers as found on automobiles are often unsatisfactory, and the downsizing of automobiles prohibits the carrying of bicycles inside the automobile.

Various other apparatus has been proposed such as that illustrated in the Davis, U.S. Pat. No. 718,322; Mason, U.S. Pat. No. 937,835; Elson, U.S. Pat. No. 1,002,507; Rea, U.S. Pat. No. 2,212,958; French Patent No. 947,103, and United Kingdom Patent No. 464,351.

In my prior U.S. Pat. No. 4,114,919, towing apparatus for bicycles is described, which includes members attached to bicycles for towing one by the other. While this apparatus is satisfactory, it is a complicated structure which requires the towed bicycle to be towed in an inverted position, with the front bicycle pivoted and clamped in a rearward position. In addition, my prior structure is restricted to bicycle use while the apparatus of the present invention can be used with a wide variety of wheeled vehicles.

SUMMARY OF THE INVENTION

Towing apparatus for towing wheeled vehicles which includes a member fixed to a towing vehicle to which a second member is pivotedly and detachably connected and attached to a third member on the towed vehicle.

The principal object of the invention is to provide universal towing apparatus for towing of a wheeled vehicle by another vehicle, by means of members attached to each vehicle and connected to each other.

A further object of the invention is to provide towing apparatus of the character aforesaid that is useful with a wide variety of vehicles.

A further object of the invention is to provide towing apparatus of the character aforesaid which permits of towing vehicles such as bicycles in either the upright or inverted position.

A further object of the invention is to provide towing apparatus of the character aforesaid which is simple to construct and has only a minimum number of parts.

A further object of the invention is to provide towing apparatus of the character aforesaid which is easy to install and use.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which:

FIG. 2 is a side elevational view, in partial phantom, illustrating the towing apparatus of the invention towing a bicycle in the inverted position.

Figure 1:
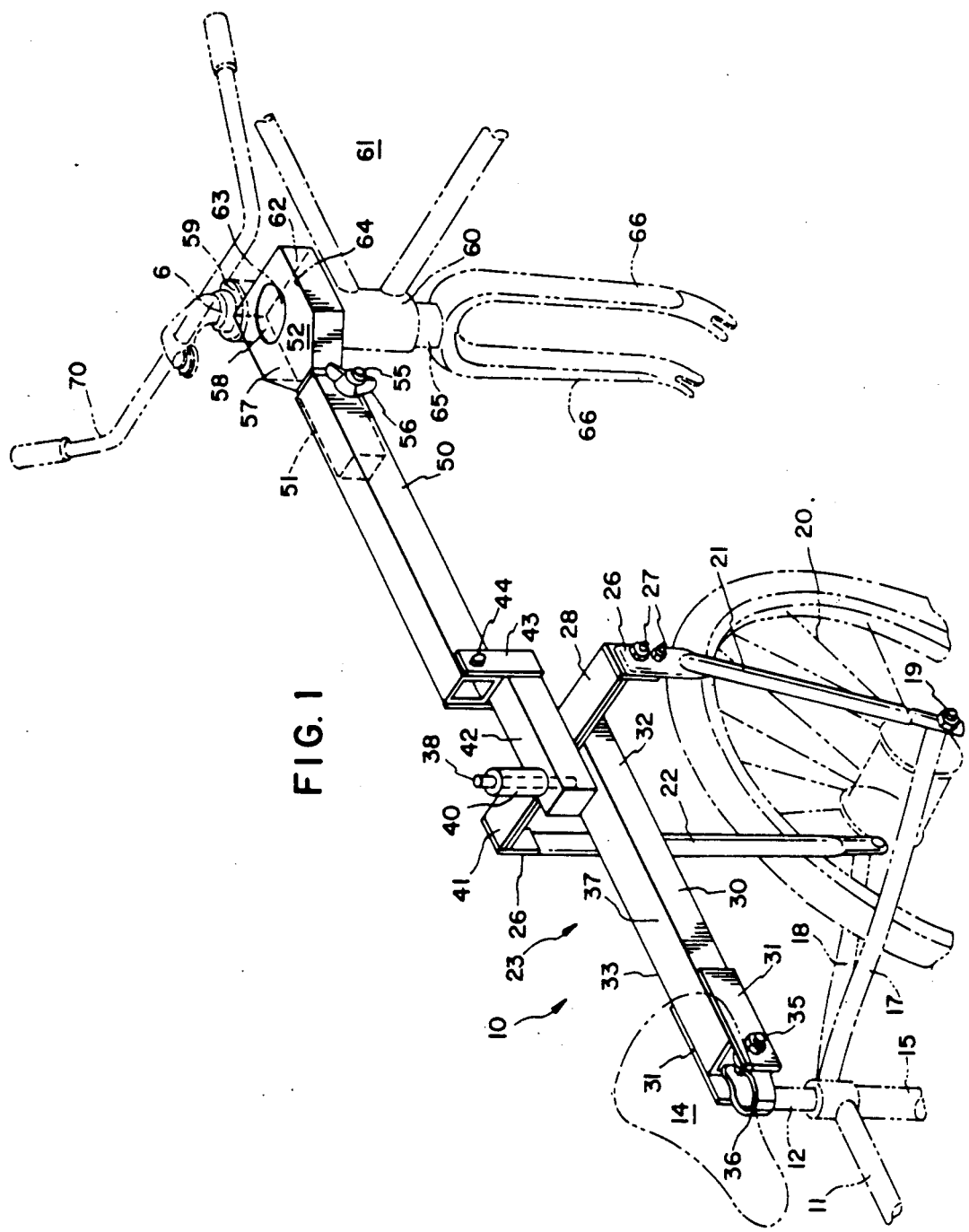
FIG. 1 is a view in perspective, in partial phantom, illustrating the towing apparatus of the invention towing a bicycle in the upright position.

It should, of course, be understood that the description and drawings herein are illustrative merely, and that various modifications and changes can be made in the structure disclosed without departing from the spirit of the invention.

DESCRIPTION OF THE PREFERRED EMBODIMENT

Referring now more particularly to the drawings and FIGS. 1 and 2 thereof a towing vehicle illustrated in phantom as a bicycle 10, is shown which has a frame 11, with a post 12 of a bicycle seat 14, engaged therein, in tube 15, of frame 11 to which rear fork members 17 and 18 are attached thereto which extend rearwardly, downwardly and divergently with a transverse shaft 19 connecting them. A conventional bicycle wheel assembly 20 is provided, carried on the shaft 19, which shaft has upwardly extending arms 21 and 22 of a first member 23 retained thereon by nuts 25.

The arms 21 and 22 are connected to downwardly extending plates 26 by bolts 27, the plates being connected to transverse plate 28, which is connected to a forwardly extending hollow tube 30, of rectangular configuration in cross section.

The tube 30 has plates 31 on its sides 32 and 33 which plates extend forwardly past the end of the tube, with a bolt 35 extending therebetween carrying a collar 36, which is engaged in gripping relation with post 12.

The tube 30 on its top surface 37 at the end opposite to collar 36 has a pin 38 extending vertically upwardly therefrom. The second or intermediate member 41 is detachably engaged with pin 38 and rotatable thereabout and rests on surface 37 of tube 30. The bushing 40 is connected to tube 42 of rectangular configuration in cross section which extends rearwardly with downwardly extending plates 43 connected thereto, with a bolt 44 extending therebetween and pivotely engaged with a hollow connecting tube 50 which is of rectangular configuration in cross section. Tube 50 can thereby be positioned by pivoting about bolt 44 as required.

The tube 50 has a tongue 51 of a third or yoke member 52 engaged therewith, and detachably retained herein by bolt 55 and wing nut 56.

The yoke 52 has a body portion 57 with opening 58 to engage stem 59 of frame 60 of a towed vehicle which is illustrated as a bicycle 61. A clamping plate 62 is provided which has an opening 63 to engage the stem 59 and with cap screws 64 engaged in yoke member 52 to retain it on stem 59. Stem 59 has a steering shaft 65 therein which is connected to the front forks 66 of bicycle 61, and shaft 65 has handlebars 70 of conventional type attached thereto.

The mode of operation should be apparent from the foregoing. It should be noted and as shown in FIG. 1 the towed bicycle 61 can be towed in the upright position with the front wheel assembly (not shown) removed. As shown in FIG. 2, if desired, the towed bicycle 61 can be readily towed in the inverted position, with the front wheel assembly 71 in place on forks 66 thereby simplifying the procedure required for towing. While the invention is illustrated for use with the towing of bicycles, its use is not limited to bicycles but can be utilized with a wide variety of wheeled vehicles, such as shopping carts, golf carts, motorcycles and just about any other variety of wheeled vehicle.

It is thus apparent that the objects of the invention are attained.

I claim:

1. Apparatus for towing a wheeled vehicle by another vehicle which comprises
    a first member attached to said towing vehicle and having a flat surface from which a vertical pivot pin extends intermediate its ends
    a second intermediate member having a horizontal pivoting means at one end for engaging said vertical pivot pin and a vertical pivoting means at the other end,
    a hollow connecting tube extending from said vertical pivoting means at one end and
    a third member attached to said towed vehicle and detachably connected with said tube at the other end.

2. Apparatus as defined in claim 1 in which said towing vehicle has a vertical post, said first member has a clamp attached to said post.

3. Apparatus as defined in claim 1 in which said third member is a yoke attached to said towed vehicle and having a tongue means for detachably connecting said connecting tube, and retaining means to retain said tongue in said connecting tube.

* * * * *